(12) United States Patent
Meng

(10) Patent No.: US 9,673,938 B2
(45) Date of Patent: Jun. 6, 2017

(54) METHOD FOR CONFIGURING TABLE OF NETWORK APPARATUS IN LTE TDD SYSTEM AND NETWORK APPARATUS USING THE SAME

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 170 days.

(21) Appl. No.: 14/603,374

(22) Filed: Jan. 23, 2015

(65) Prior Publication Data

US 2015/0215094 A1 Jul. 30, 2015

Related U.S. Application Data

(60) Provisional application No. 61/930,965, filed on Jan. 24, 2014.

(51) Int. Cl.
*H04L 1/00* (2006.01)
*H04L 5/14* (2006.01)
*H04L 5/00* (2006.01)
*H04L 1/18* (2006.01)

(52) U.S. Cl.
CPC .......... *H04L 1/1861* (2013.01); *H04L 1/1893* (2013.01); *H04L 5/0055* (2013.01); *H04L 5/1469* (2013.01); *H04L 2001/0097* (2013.01)

(58) Field of Classification Search
CPC ... H04L 1/1861; H04L 1/1893; H04L 5/1469; H04L 5/0055; H04L 2001/0097
See application file for complete search history.

(56) References Cited

U.S. PATENT DOCUMENTS 9,025,517 B2* 5/2015 Wang .................... H04W 24/02
370/321
2013/0308523 A1* 11/2013 Lee ...................... H04J 11/0069
370/315

(Continued)

OTHER PUBLICATIONS

3GPP, "Further enhancements to LTE Time Division Duplex (TDD) for Downlink-Uplink (DL-UL) interference management and traffic adaptation," 3GPP TR 36.828 V11.0.0, Jun. 2012, pp. 1-109.

(Continued)

*Primary Examiner* — Christopher Grey
*Assistant Examiner* — Richard Schnell
(74) *Attorney, Agent, or Firm* — Jianq Chyun IP Office

(57) ABSTRACT

The disclosure is directed to a method and apparatus for configuring a table of a network apparatus in a Long Term Evolution (LTE) time division duplexing (TDD) communication system. In one of the exemplary embodiments, the method would include identifying, from UL HARQ reference configurations and DL HARQ reference configurations, valid combinations that are compatible with an eIMTA relay; obtaining, for each of the valid combinations of the UL HARQ reference configurations and the DL HARQ reference configurations, a set of valid UL-DL subframe configuration that is compatible with the eIMTA relay; and obtaining, for each of the valid combinations of the UL HARQ reference configurations and the DL HARQ reference configurations, a set of valid SubframeConfiguration-TDD that is compatible with the eIMTA relay.

20 Claims, 12 Drawing Sheets

(56) References Cited

U.S. PATENT DOCUMENTS

| | | | | |
|---|---|---|---|---|
| 2014/0334457 A1* | 11/2014 | Tiirola | ............... | H04L 5/0096 |
| | | | | 370/336 |
| 2014/0341051 A1* | 11/2014 | Gaal | ............... | H04W 24/10 |
| | | | | 370/252 |
| 2016/0149687 A1* | 5/2016 | Lei | ............... | H04W 16/10 |
| | | | | 370/280 |
| 2016/0242038 A1* | 8/2016 | Lei | ............... | H04W 16/10 |

OTHER PUBLICATIONS

3GPP, "Final Report of 3GPP TSG RAN WG1 #74bis," 3GPP TSG RAN WG1 Meeting #75, Nov. 11-15, 2013, pp. 1-94.

ETSI, "Physical channels and modulation(3GPP TS 36.211 version 11.0.0 Release 11)," ETSI TS 136 211 V11.0.0, Oct. 2012, pp. 1-108.

ETSI, "Physical layer procedures (3GPP TS 36.213 version 11.0.0 Release 11)," ETSI TS 136 213 V11.0.0, Oct. 2012, pp. 1-145.

ETSI, "Medium Access Control (MAC) protocol specification (3GPP TS 36.321 version 11.0.0 Release 11)," ETSI TS 136 321 V11.0.0, Oct. 2012, pp. 1-57.

ETSI, "Multiplexing and channel coding (3GPP TS 36.212 version 11.0.0 Release 11)," ETSI TS 136 212 V11.0.0, Oct. 2012, pp. 1-81.

ETSI, "Physical layer for relaying operation (3GPP TS 36.216 version 11.0.0 Release 11)," ETSI TS 136 216 V11.0.0, Oct. 2012, pp. 1-18.

\* cited by examiner

101 — TDD UL-DL Configurations

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1

| SubframeConfigurationTDD (401) | eNB-RN UL-DL configuration (402) | Subframe number |||||||||||
|---|---|---|---|---|---|---|---|---|---|---|---|
| | | 0 | 1 | 2 | 3 | 4 | 5 | 6 | 7 | 8 | 9 |
| 0 | 1 | | | | | D | | | | U | |
| 1 | | | | | U | | | | | | D |
| 2 | | | | | D | | | | | U | D |
| 3 | | | | | U | D | | | | | D |
| 4 | | | | | U | D | | | | U | D |
| 5 | 2 | | | U | | | | | | D | |
| 6 | | | | | D | | | | U | | |
| 7 | | | | U | | D | | | D | | |
| 8 | | | | | D | | | | U | | D |
| 9 | | | | U | D | D | | | | D | |
| 10 | | | | | D | | | | U | D | D |
| 11 | 3 | | | | U | | | | D | | D |
| 12 | | | | | U | | | | D | D | D |
| 13 | 4 | | | | U | | | | | | D |
| 14 | | | | | U | | | | D | | D |
| 15 | | | | | U | | | | | D | D |
| 16 | | | | | U | | | | D | D | D |
| 17 | | | | | U | D | | | D | D | D |
| 18 | 6 | | | | | U | | | | | D |

FIG. 4

| UL HARQ reference configuration (601) | DL HARQ reference configuration (602) |
|---|---|
| 1 | 2 |
| 1 | 4 |
| 1 | 5 |
| 2 | 2 |
| 2 | 5 |
| 3 | 4 |
| 3 | 5 |
| 4 | 4 |
| 4 | 5 |
| 6 | 2 |
| 6 | 4 |
| 6 | 5 |

FIG. 6

| UL HARQ reference configuration (701) | DL HARQ reference configuration (702) | Valid UL/DL configuration for dynamic reconfiguration (703) |
|---|---|---|
| 1 | 2 | 1,2 |
| 1 | 4 | 1,4 |
| 1 | 5 | 1,2,4 |
| 2 | 2 | 2 |
| 2 | 5 | 2 |
| 3 | 4 | 3,4 |
| 3 | 5 | 3,4 |
| 4 | 4 | 4 |
| 4 | 5 | 4 |
| 6 | 2 | 1,2,6 |
| 6 | 4 | 1,3,4,6 |
| 6 | 5 | 1,2,3,4,6 |

FIG. 7

| UL HARQ reference configuration (SIB1 Configuration) 801 | DL HARQ reference configuration 802 | Valid UL/DL configuration for dynamic reconfiguration 803 | Valid SubframeConfigurationTDD 804 |
|---|---|---|---|
| 1 | 2 | 1,2 | 0,1,2,3,4 |
| 1 | 4 | 1,4 | 0,1,2,3,4 |
| 1 | 5 | 1,2,4 | 0,1,2,3,4 |
| 2 | 2 | 2 | 5,6,7,8,9,10 |
| 2 | 5 | 2 | 5,6,7,8,9,10 |

FIG. 8

| UL HARQ reference configuration (SIB1 Configuration) 901 | DL HARQ reference configuration 902 | Valid UL/DL configuration for dynamic reconfiguration 903 | Valid SubframeConfigurationTDD 904 |
|---|---|---|---|
| 1 | 4 | 1,4 | 1,3 |
| 2 | 2 | 2 | 5,6,7,8,9,10 |
| 2 | 5 | 2 | 6,8,10 |
| 3 | 4 | 3,4 | 11,12 |
| 3 | 5 | 3,4 | 13,14,15,16,17 |
| 4 | 4 | 4 | 13,14,15,16,17 |
| 4 | 5 | 4 | 13,14,15,16,17 |

FIG. 9

| SubframeConfigurationTDD | eNB-RN UL-DL configuration | DL HARQ reference configuration |
|---|---|---|
| 0 | 1 | 2 |
|   |   | 4 |
|   |   | 5 |

FIG. 11A

| SubframeConfigurationTDD | eNB-RN UL-DL configuration | DL HARQ reference configuration | Valid UL/DL configuration for reconfiguration |
|---|---|---|---|
| 0 | 1 | 2 | 1,2 |
|   |   | 4 | 1,4 |
|   |   | 5 | 1,2,4 |

FIG. 11B

| SubframeConfigurationTDD (1201) | eNB-RN UL-DL configuration (1202) | DL HARQ reference configuration (1203) | Valid UL/DL configuration for reconfiguration (1204) |
|---|---|---|---|
| 0 | 1 | 2 | 1 |
| | | 4 | 1 |
| | | 5 | 1 |
| 1 | | 2 | 1 |
| | | 4 | 1,4 |
| | | 5 | 1,4 |
| 2 | | 2 | 1 |
| | | 4 | 1 |
| | | 5 | 1 |
| 3 | | 2 | 1 |
| | | 4 | 1,4 |
| | | 5 | 1,4 |
| 4 | | 2 | 1 |
| | | 4 | 1 |
| | | 5 | 1 |
| 5 | 2 | 2 | 2 |
| 6 | | 2 | 2 |
| | | 5 | 2 |
| 7 | | 2 | 2 |
| 8 | | 2 | 2 |
| | | 5 | 2 |
| 9 | | 2 | 2 |
| 10 | | 2 | 2 |
| | | 5 | 2 |
| 11 | 3 | 4 | 3,4 |
| | | 5 | 3,4 |
| 12 | | 4 | 3,4 |
| | | 5 | 3,4 |
| 13 | 4 | 4 | 4 |
| | | 5 | 4 |
| 14 | | 4 | 4 |
| | | 5 | 4 |
| 15 | | 4 | 4 |
| | | 5 | 4 |
| 16 | | 4 | 4 |
| | | 5 | 4 |
| 17 | | 4 | 4 |
| | | 5 | 4 |
| 18 | 6 | 2 | 6 |
| | | 4 | 3,6 |
| | | 5 | 3,6 |

FIG. 12

METHOD FOR CONFIGURING TABLE OF NETWORK APPARATUS IN LTE TDD SYSTEM AND NETWORK APPARATUS USING THE SAME

CROSS REFERENCE TO RELATED APPLICATION

This application claims the priority benefit of U.S. provisional application Ser. No. 61/930,965, filed on Jan. 24, 2014. The entirety of the above-mentioned patent application is hereby incorporated by reference herein and made a part of this specification.

TECHNICAL FIELD

The disclosure is directed to a method and an apparatus for configuring a table of a network apparatus in a Long Term Evolution (LTE) time division duplexing (TDD) communication system and a network apparatus using the same method.

BACKGROUND

The topic of "Further Enhancements to LTE Time Division Duplex (TDD) for Downlink-Uplink (DL-UL) Interference Management and Traffic Adaptation" (eIMTA) has been agreed as a study item in $3^{rd}$ Generation Partnership Project (3GPP) release 11 and as a work item in 3GPP release 12. Thus, reconfiguration mechanism and interference mitigation scheme have been topics under discussion for devices having "Enhanced Interference Mitigation & Traffic Adaptation" (eIMTA) capabilities. For an eIMTA network apparatus such as a base station, a relay station, or a user equipment (UE), the UL-DL subframe configuration can be modified once for as short as every 10 milliseconds. Otherwise, without eIMTA, the UL-DL subframe configuration of a network apparatus can only be changed every modification period of the system information. Performance evaluation of various deployment scenarios has been conducted by both 3GPP RAN 1 and RAN 4 working groups. It has been shown that the average cell throughput of a Time Division Duplex (TDD) Long Term Evolution (LTE) communication system can be improved to a large extent by adopting eIMTA. Relay stations have been introduced in 3GPP release 10 as a means for coverage extension and/or throughput enhancement. It can be envisioned that relay stations be enhanced with the capability of eIMTA in future releases.

As TDD is utilized in eIMTA, TDD offers flexible deployments without requiring a pair of spectrum resources. Currently, LTE TDD allows for asymmetric DL-UL allocations by providing a predefined set of semi-statistically configured UL-DL configurations that is illustrated in FIG. 1. According to FIG. 1, for the case of a current LTE communication system for example, there could be seven different UL-DL configurations 101 which define whether a subframe of a radio frame is an uplink subframe, a downlink subframe, or a special subframe. These configurations can provide between 40% and 90% DL subframes. For transmissions between a macro base station and a relay node, the base station would be able to configure each subframe of a radio frame as a downlink subframe, an uplink subframe, or as a special subframe by selecting one of configurations 0~7 as shown in FIG. 1, and the configuration would be communicated throughout a cell via a system information block (SIB) such as SIB 1.

Since the semi-static configuration may not match the instantaneous traffic condition, currently a UL-DL configuration could be reconfigured based on a system information change procedure. Additional mechanisms could include means such as dynamic reconfiguration of subframes to a different UL-DL configuration. In comparison to the system information change procedure, a dynamic mechanism may allow a much shorter period to reconfigure of the current TDD DL-UL configuration. Such idea has been termed eIMTA in 3GPP. Evaluations in the corresponding study items have revealed significant performance benefits by allowing dynamic TDD UL-DL reconfigurations based on traffic adaptations in small cells according to "*Further enhancements to LTE TDD for DL-UL interference management and traffic adaptation,*" 3GPP TR 36.828, V11.0.0, 2012-06. Also, dynamic signaling mechanisms would usually outperform a system that uses a system information change procedure. Further details related to LTE TDD frame structure and UL-DL configurations are described in "*Physical Channels and Modulation*", 3GPP TS 36.211, V1.0.0, 2012-09, which is incorporated by reference. The aforementioned TS 36.211 reference also describes the current implementation of MBSFN, frame structure type 2, and control format indicator channel in further details.

In a legacy LTE TDD system, the DL Hybrid Automatic Repeat Request (HARQ) is defined separately and independently for each UL-DL configuration. Dynamic changes of UL-DL configurations in a TDD eIMTA system may therefore cause a DL HARQ timing discontinuity. Specific details regarding the current UL HARQ and DL HARQ operations are recorded in "*Physical Layer Procedures*", 3GPP TS 36.213, V11.0.0, 2012 September which is incorporated by reference. According to Draft Report of 3GPP TSG RAN WG1 #74bis, it has been agreed by 3GPP RAN WG1 that a DL HARQ reference configuration is selected from UL/DL configuration {2, 4, 5} and is configured by higher layer signaling.

Subframes that are configured as UL in DL HARQ reference configuration cannot be changed to a DL subframe. Similarly, as an UL HARQ reference configuration is selected and follows the UL-DL configuration as indicated in System Information Block 1 (SIB1), a subframe that is configured as DL in UL HARQ reference configuration by SIB 1 cannot be dynamically changed to an UL subframe. Therefore, in order to implement a dynamic reconfiguration which is to change the current UL-DL configuration disregarding system information modification boundaries, valid UL-DL configurations 203 that corresponds to a UL HARQ reference configuration 201 and a DL HARQ reference configuration 202 could be obtained and summarized in FIG. 2. The current implementation UL-DL configuration for eIMTA is further described in "*Physical Layer Procedures*", 3GPP TS 36.213, V11.0.0, 2012 September which is incorporated by reference.

Relay stations are introduced in 3GPP release 10 as a means for coverage extension and/or throughput enhancement. FIG. 3 illustrates an exemplary LTE communication system that includes at least but not limited to a base station 301 communicating with a user equipment (UE) 303 through a relay node 302. The base station 301 may transmit to the relay node 302 through a downlink channel, and the relay node 302 may transmit to the UE 303 through a downlink channel on the same frequency but in a different time slot. The downlink transmission between base station 301 and the relay node 302 cannot occur the same time as the transmission between the relay node 302 and the UE 303 since both downlink transmissions share the same frequency spectrum. Therefore, for in band relays, transmission gaps where the relay stations stops transmitting to or receiving from UE have to be configured on a regular basis to allow backhaul communication between the relay and the macro base station. Relay stations cannot utilize TDD configuration 0 and 5 because of the deficient number of DL and UL subframes. For the remaining 5 configurations, configurations {1, 2, 3, 4, 6}, the backhaul subframe configuration defines the DL-UL configuration for backhaul communication between the relay and the macro base station.

The conventional subframe configurations for a backhaul link between a base station and a relay node is defined as SubframeConfigurationTDD in FIG. 4. The current implementation of SubframeConfigurationTDD as shown in FIG. 4 is further described in "*Physical Layer for Relaying Operation*", 3GPP TS 36.216, V11.0.0, 2012 September which is incorporated by reference. The aforementioned TS 36.216 reference also describes related implementations of physical channels and modulation in detail. For FIG. 4, as mentioned previously, configurations 0 and 5 from FIG. 1 have been disregarded because of insufficient uplink or downlink subframes. The eNB-RN UL-DL configuration 402 lists remaining possible TDD configurations to be used between a base station 301 and a relay node 302. For each eNB-RN UL-DL configuration, one or multiple possible TDD subframe configurations could be used between a base station 301 and a relay node 302 as listed in SubframeConfigurationTDD 401. In general, the SubframeConfiguration TDD is a label that describes one or more different configurations of subframes for each UL-DL configuration for transmission between a base station and a relay node and can be configured for higher level signaling.

However, to incorporate the operation of eIMTA, the conventional transmission gaps used by a relay station may hinder the operation of eIMTA. Consequently, eIMITA cannot be directly applied on a relay node.

SUMMARY OF THE DISCLOSURE

Accordingly, the disclosure is directed to a method for configuring a table of a networking apparatus in a Long Term Evolution (LTE) time division duplexing (TDD) communication system.

In one of the exemplary embodiments, the present disclosure is directed to a method of configuring a table of a networking apparatus in a LTE TDD system. The method would include at least but not limited to: identifying, from UL HARQ reference configurations and DL HARQ reference configurations, valid combinations that are compatible with an eIMTA relay by removing a UL-DL subframe configuration having only one UL subframe or only two DL subframes from the UL HARQ reference configurations; obtaining, for each of the valid combinations of the UL HARQ reference configurations and the DL HARQ reference configurations, a set of valid UL-DL subframe configuration that is compatible with the eIMTA relay by removing a UL-DL subframe configuration having only one UL subframe or only two DL subframes from the set of valid UL-DL subframe configuration; obtaining, for each of the valid combinations of the UL HARQ reference configurations and the DL HARQ reference configurations, a set of valid SubframeConfigurationTDD that is compatible with the eIMTA relay by removing a UL-DL subframe configuration of the valid SubframeConfiguratinTDD having a UL subframe number appearing in a DL subframe set of the valid combinations of the set of valid UL-DL subframe configurations; and configuring the eIMTA relay according to the set of valid SubframeConfiguraitonTDD for each of the valid combinations of the UL HARQ reference configurations and the DL HARQ reference configurations.

In one of the exemplary embodiment, the present disclosure is directed to a network apparatus which includes at least but not limited to a transmitter for transmitting wireless data; a receiver for receiving wireless data; a non-transitory storage medium which records relationships among UL HARQ reference configurations, DL HARQ reference configurations, valid combinations of UL-DL configurations, and valid SubframeConfigurationTDD; and a processing circuit that includes at least but not limited to a subframe configuration module that configures the networking apparatus according to the relationships among UL HARQ reference configurations, DL HARQ reference configurations, valid combinations of UL-DL configurations, wherein the relationships are defined according to:

| UL HARQ reference configuration | DL HARQ reference configuration | Valid combinations of UL-DL configurations | Valid SubframeConfigurationTDD |
|---|---|---|---|
| 1 | 4 | 1, 4 | 1, 3 |
| 2 | 2 | 2 | 5, 6, 7, 8, 9, 10 |
| 2 | 5 | 2 | 6, 8, 10 |
| 3 | 4 | 3, 4 | 11, 12 |
| 3 | 5 | 3, 4 | 11, 12 |
| 4 | 4 | 4 | 13, 14, 15, 16, 17 |
| 4 | 5 | 4 | 13, 14, 15, 16, 17 |

In one of the exemplary embodiments, the present disclosure is directed to a method of configuring a table of a network apparatus in a LTE TDD system. The method would include at least but not limited to: determining supported uplink(UL)-downlink(DL) subframe configurations for transmissions between an evolved node B (eNB) and a relay node (RN) by defining relationships among SubframeConfigurationTDD, eNB-RN UL-DL configuration, and subframe numbers; augmenting the supported UL-DL subframe configurations by including three DL hybrid automatic repeating request (HARQ) reference configurations; determining valid combinations by obtaining a set of valid UL-DL subframe configuration for dynamic reconfiguration for each combination of SubframeConfigurationTDD, eNB-RN UL-DL configuration, and DL HARQ reference configuration; and configuring an eIMTA relay according to the valid combinations.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 illustrates conventional UL-DL subframe configurations for a LTE communication system.

FIG. 4 illustrates currently supported configurations for transmission between a base station and a relay node using frame structure type 2.

FIG. 6 illustrates valid combinations of UL HARQ reference configuration and DL HARQ reference configuration for configuring eIMTA relay in accordance with one of the exemplary embodiments of the disclosure.

FIG. 7 illustrates a set of valid UL-DL subframe configurations for dynamic reconfiguration for each valid combination of UL HARQ reference configuration and DL HARQ reference configuration for configuration an eIMTA in accordance with one of the exemplary embodiments of the disclosure.

FIG. 8 illustrates a set of valid SubframeConfigurationTDD for each UL HARQ reference configuration for configuring an eIMTA relay in accordance with one of the exemplary embodiments of the disclosure.

FIG. 9 illustrates a refined SubframeConfigurationTDD as a function of UL HARQ reference configuration, DL HARQ reference configuration, and valid SubframeConfigurationTDD for configuration an eIMTA relay in accordance with one of the exemplary embodiments of the disclosure.

FIG. 11A illustrates augmenting FIG. 4 by including three DL HARQ reference configurations for configuration an eIMTA relay in accordance with one of the exemplary embodiments of the disclosure.

FIG. 11B illustrates a set of valid UL-DL subframe configurations for dynamic reconfiguration based on the combination of UL HARQ reference configuration and DL HARQ reference configuration and FIG. 2 for configuration an eIMTA relay in accordance with one of the exemplary embodiments of the disclosure.

FIG. 12 illustrates a complete solution that defines the relationship among SubframeConfigurationTDD, eNB-RN UL-DL subframe configuration, DL HARQ reference configuration, and valid UL-DL configuration for dynamic reconfiguration in accordance with one of the exemplary embodiments of the disclosure.

DETAILED DESCRIPTION OF DISCLOSED EMBODIMENTS

Figure 2:
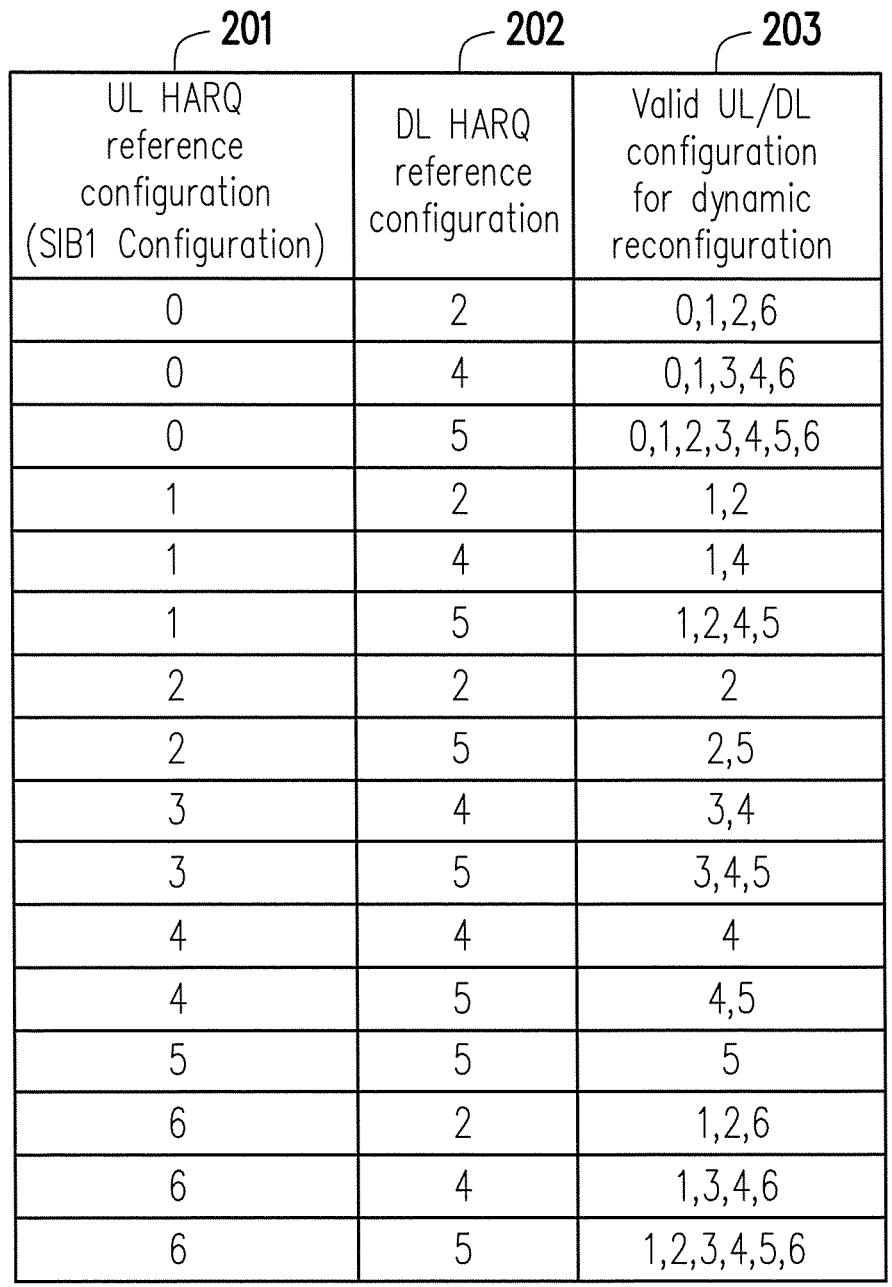
FIG. 2 illustrates valid UL-DL configurations when dynamic reconfiguration is implemented in a LTE communication system.
Figure 3:
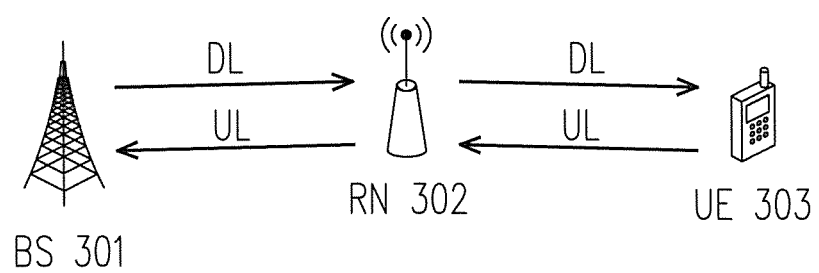
FIG. 3 illustrates an exemplary wireless network that utilizes a relay under a LTE TDD framework.

Reference will now be made in detail to the present exemplary embodiments of the disclosure, examples of which are illustrated in the accompanying drawings. Wherever possible, the same reference numbers are used in the drawings and the description to refer to the same or like parts.

In order to allow backhaul communication between a relay and a macro base station, transmission gaps where the relay station stops transmitting to or receiving from UEs have to be configured on a regular basis. Conventionally, the supported configurations as possible reconfigurations during transmissions between a macro base station and a relay node is defined as SubframeConfigurationTDD as shown in FIG. 4. However, the aforementioned transmission gaps on relay stations would hinder the operation of eIMTA. Consequently, eIMTA cannot be readily utilized by a relay node without modifications. Accordingly, a method for configuring relay stations which takes both eIMTA and the configuration of SubframeConfigurationTDD into account and an apparatus using the same method are proposed.

The present disclosure is concerned with a LTE TDD system that utilizes an in-band relay enabled with functionalities of eIMTA. For in-band relays, transmission gaps where a relay station stops transmitting to or receiving from a user equipment (UE) have to be configured on a regular basis to allow backhaul communication between a relay and a macro base station. Valid TDD DL-UL configurations for relay stations based on the configured transmission gaps would need to be obtained.

Figure 5:
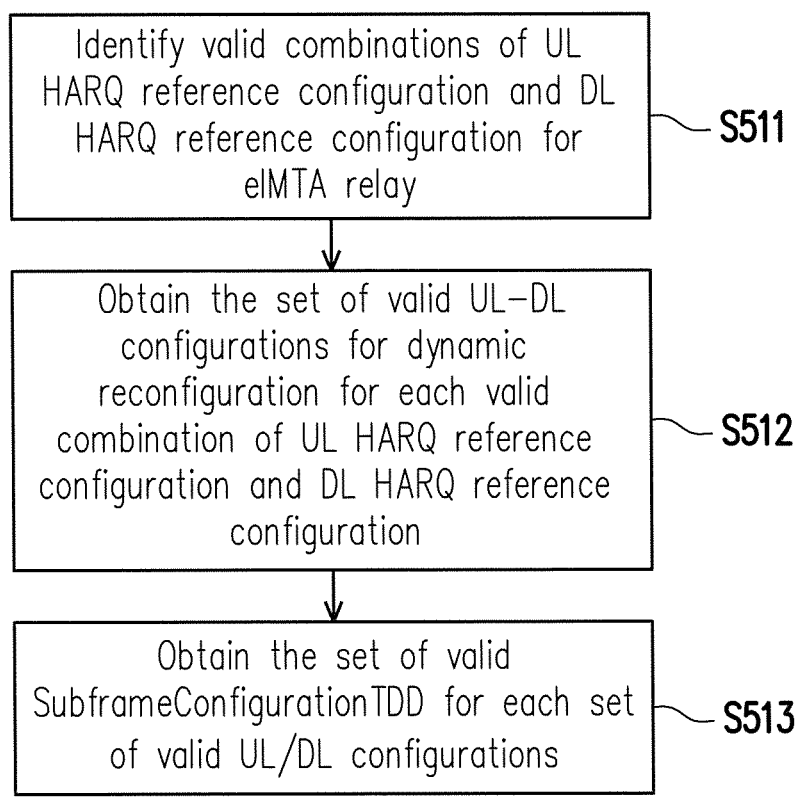
FIG. 5 illustrates a first exemplary embodiment of the method for configuring eIMTA relay in a Long Term Evolution (LTE) time division duplexing (TDD) communication system.

In order to solve the aforementioned problem, the disclosure proposes two exemplary embodiments. FIG. 5 illustrates a first exemplary embodiment of the method for configuring eIMTA relay in a Long Term Evolution (LTE) time division duplexing (TDD) communication system. The first exemplary embodiment proposes at least but not limited to steps S511, S512, and S513. Step S511 includes identifying, from UL HARQ reference configurations and DL HARQ reference configurations, valid combinations that are compatible with the eIMTA relay by at least removing a UL-DL subframe configuration having insufficient number of UL subframe or DL subframe from the UL HARQ reference configurations. Step S512 includes obtaining, for each of the valid combinations of the UL HARQ reference configurations and the DL HARQ reference configurations, a set of valid UL-DL subframe configuration that is compatible with the eIMTA relay by at least removing a UL-DL subframe configuration having insufficient number of UL subframe or DL subframe from the set of valid UL-DL subframe configuration. Step S513 includes obtaining, for each of the valid combinations of the UL HARQ reference configurations and the DL HARQ reference configurations, a set of valid SubframeConfigurationTDD that is compatible with the eIMTA relay by at least removing a UL-DL subframe configuration of SubframeConfigurationTDD having a UL subframe number appearing in an DL subframe set of the valid combinations of the set of valid UL-DL subframe configurations. Consequently, the transmission between a macro base station and an eIMTA relay could be configured according to the set of valid SubframeConfiguraitonTDD for each of the valid combinations of the UL HARQ reference configurations and the DL HARQ reference configurations. Specific details of FIG. 5 are provided by FIG. 6~FIG. 9 and their corresponding written descriptions.

For step S511, as previously described in FIG. 4, TDD UL-DL subframe configuration 0 and 5 could not be supported in SIB1 configuration for a relay node, since configuration 0 and configuration 5 either does not have sufficient downlink subframe or sufficient uplink subframe. By removing configuration 0 and configuration 5 from UL HARQ reference configuration 201 of FIG. 2, valid combinations of UL HARQ reference configuration and DL HARQ reference configuration for an eIMTA relay node could be obtained as illustrated in FIG. 6 which shows valid combinations of UL HARQ reference configuration 601 and DL HARQ reference configuration 602 for configuring eIMTA relay in accordance with one of the exemplary embodiments of the disclosure.

For step S512, FIG. 6 would be extended by determining the set of valid UL-DL configurations for dynamic reconfiguration for each combination of UL HARQ reference configuration 601 and DL reference configuration 602 based on FIG. 2. The set of valid UL-DL configurations compatible with eIMTA could be obtained by removing TDD UL-DL configuration 0 and configuration 5 from valid UL-DL configurations for dynamic reconfiguration 203 that was shown in FIG. 2. The result is shown in FIG. 7 which illustrates a set of valid UL-DL subframe configurations for dynamic reconfiguration 703 for each valid combination of UL HARQ reference configuration 701 and DL HARQ reference configuration 702 for configuration an eIMTA in accordance with one of the exemplary embodiments of the disclosure.

As for step S513, a valid SubframeConfigurationTDD 401 could be obtained from FIG. 4 for each UL HARQ reference configuration 701. As an example, FIG. 8 illustrates a set of valid SubframeConfigurationTDD 804 for each UL HARQ reference configuration 801, DL HARQ reference configuration 802, and valid UL-DL configuration for dynamic reconfiguration 803 for configuring an eIMTA relay in accordance with one of the exemplary embodiments of the disclosure. When UL HARQ reference configuration 801 is 1, it can be derived from FIG. 4 that the valid SubframeConfigurationTDD 804 is 0, 1, 2, 3, and 4. Also for another example, when UL HARQ reference configuration 801 is 2, it can be derived from FIG. 4 that the valid SubframeConfigurationTDD 804 is 5, 6, 7, 8, 9, and 10.

Next, the valid_SubframeConfigurationTDD 804 will be refined by removing any UL-DL subframe configuration of SubframeConfigurationTDD in which subframe numbers corresponding to UL appear in the associated DL subframe set. The DL subframe associated with a set of valid UL-DL configuration for dynamic reconfiguration is defined as the union of the subframe numbers corresponding to DL in all the UL-DL configurations in valid UL-DL configurations for dynamic reconfiguration. For example, the subframe number corresponding to DL for subframe configuration 1 is {0, 1, 4, 5, 9} and the subframe number corresponding to DL for subframe configuration 4 is {0, 1, 4, 5, 6, 7, 8, 9}, and therefore the DL subframe set associated with valid UL-DL configuration for dynamic reconfiguration 803 ={1, 4} is subframe numbers {0, 1, 4, 5, 6, 7, 8, 9}.

Next, all the valid subframeConfigurationTDD would be examined to remove any configuration in which the subframe corresponding to UL appear in the associated DL subframe set. For example, for UL HARQ reference configuration 801=1 and Valid UL/DL configuration for dynamic reconfiguration={1, 4}, the valid subframeconfigurationTDD before the refinement is {0, 1, 2, 3, 4}. Based on FIG. 4, it can be seen that the subframe corresponding to UL for configuration 0 is subframe number 8, but subframe number 8 appears in the DL subframe set which is {0, 1, 4, 5, 6, 7, 8, 9}, and thus configuration 0 is to be removed from the valid subframeConfigurationTDD. Similar, the subframe corresponding to UL for configuration 1 is subframe number 3 which is not in the DL subframe set. Therefore, configuration 1 is to be kept. By applying the same principle for the rest of the configurations, the valid subframeConfigurationTDD after the refinement is {1, 3}.

Moreover, for DL HARQ reference configuration=5, any configuration in valid SubframeConfigurationTDD in which the subframe number 2 corresponding to UL has to be removed. The reason is that the subframe number 2 is the only UL subframe in UL-DL configuration 5 and therefore cannot be used for backhaul transmission. The result of the refinement is shown in FIG. 9 which illustrates a refined SubframeConfigurationTDD 904 as a function of UL HARQ reference configuration 901, DL HARQ reference configuration 902, and valid UL-DL configuration for dynamic reconfiguration 903 in accordance with one of the exemplary embodiments of the disclosure. Based on the relationships shown in FIG. 9, the transmission between a macro base station and a relay node would be configured accordingly.

Figure 10:
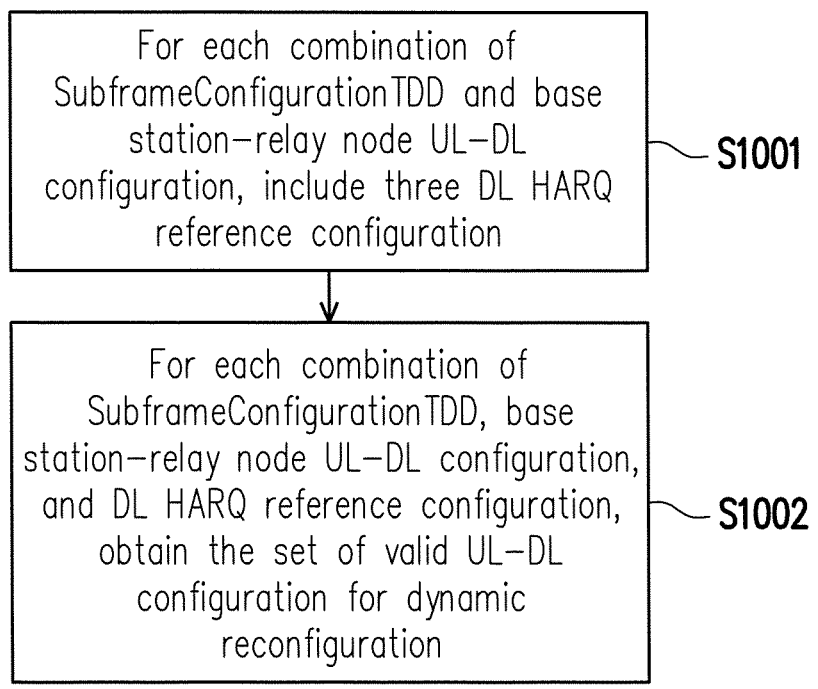
FIG. 10 illustrates a second exemplary embodiment of the method for configuring eIMTA relay in a Long Teen Evolution (LTE) time division duplexing (TDD) communication system.

FIG. 10 illustrates a second exemplary embodiment of the method for configuring eIMTA relay in a Long Term Evolution (LTE) time division duplexing (TDD) communication system. In step S1001, for each combination of SubframeConfigurationTDD and UL-DL subframe configuration for transmission between an evolved node B (eNB) and a relay node (RN), three DL HARQ reference configuration would be included. In step S1002, for each combination of SubframeConfigurationTDD, eNB-RN uplink-downlink configuration, and DL HARQ reference configuration, a set of valid UL-DL configuration for dynamic reconfiguration would be obtained. The specifics of steps S1001 and S1002 would be further elucidated by FIG. 11A, FIG. 11B, FIG. 12 and their corresponding written descriptions.

For step S1001, FIG. 4 is to be augmented by including all three aforementioned DL HARQ reference configurations, which are configurations 2, 4, and 5. FIG. 11A illustrates a specific case or a particular part of the table including eNB-RN configuration 1102 and DL HARQ reference configuration 1103 when SubframeConfigurationTDD 1101 equals to zero. For this exemplary embodiment, the eNB-RN uplink-downlink configuration 1102 corresponds to UL HARQ reference configuration for an eIMTA relay.

Next the DL HARQ reference configuration is to be refined. For DL HARQ reference configuration 5, if subframe 2 in the associated SubframeConfigurationTDD corresponds to an UL subframe, then the DL HARQ reference configuration would be invalid and has to be removed. For example, for the case when SubframeConfigurationTDD equals to 5, 7, and 9, the abovementioned refinement step would apply.

For step S1002, a set of valid UL-DL configuration for dynamic reconfiguration would be obtained based on the combination of UL HARQ reference configuration, DL HARQ reference configuration and FIG. 2 Next, UL-DL subframe configuration 5 from all the sets of valid UL-DL subframe configuration for dynamic reconfiguration would be removed since it is not supported in a legacy relay. The part for the case when SubframeConfigurationTDD equals zero is illustrated by FIG. 11B.

FIG. 12 illustrates a complete solution that defines the relationship among SubframeConfigurationTDD, eNB-RN UP-DL subframe configuration, DL HARQ reference configuration, and valid UL-DL configuration for dynamic reconfiguration in accordance with one of the exemplary embodiments of the disclosure. To obtain FIG. 12, the sets of valid DL-UL subframe configurations for dynamic reconfiguration would be refined by examining all the UL-DL configurations in each set of valid UL-DL subframe configurations for dynamic reconfiguration and remove any UL-DL configuration in which subframe numbers correspond to DL coincide with the subframe numbers corresponding to UL in SubframeConfigurationTDD. For example, for SubframeConfigurationTDD equals to zero and DL HARQ reference configuration equals to 2, the valid UL-DL subframe configurations for dynamic reconfiguration before and after the refinement are {1, 2} and {1} respectively.

Figure 13:
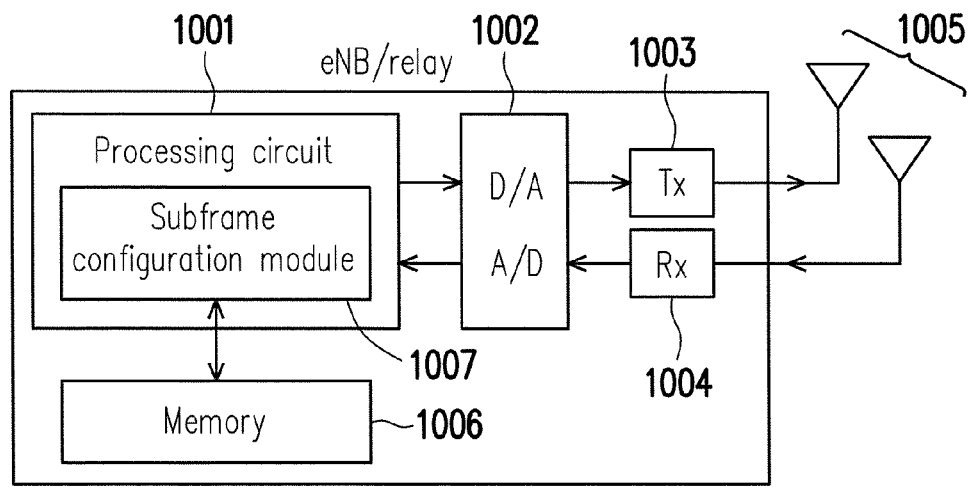
FIG. 13 illustrates an exemplary network apparatus that would be used to execute the method for configuring eIMTA relay in a Long Term Evolution (LTE) time division duplexing (TDD) communication system.

FIG. 13 illustrates an exemplary network apparatus that would be used to execute the method for configuring eIMTA relay in a Long Term Evolution (LTE) time division duplexing (TDD) communication system. A base station, a eNB, a relay node, and so forth could all have a structure similar to FIG. 13. In detail, the network apparatus may include not limited to a processing circuit 1001, an A/D D/A circuit 1002, a transmitter 1003, a receiver 1004, one or more antennas 1005, and a memory (non-transitory storage medium) 1006. As wireless data is received by a RF receiver, the wireless data could be down converted to directly or indirectly to base band before converted into digital data by the D/A A/D circuit 1002. The processor may include a subframe configuration module 1007 which would be involved in all or most of the aforementioned method for configuring eIMTA relay, including both the first exemplary embodiment and the second exemplary embodiment. The processor 1001 may also be connected to a non-transitory storage medium 1006 which would contain a circuit or a table which records information such as ones illustrates in FIG. 1, FIG. 2, FIG. 4, FIG. 9, FIG. 12, and so forth.

Figure 14:
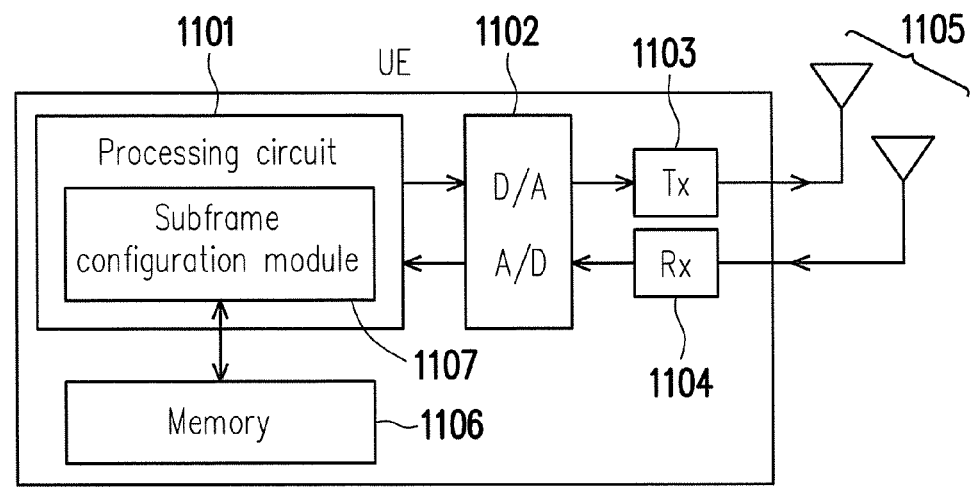
FIG. 14 illustrates an exemplary user equipment that would be used to execute the method for configuring eIMTA relay in a Long Term Evolution (LTE) time division duplexing (TDD) communication system.

FIG. 14 illustrates an exemplary user equipment (UE) that would be used to execute the method for configuring eIMTA relay in a Long Term Evolution (LTE) time division duplexing (TDD) communication system. The exemplary UE would include not limited to a processing circuit 1101, an A/D D/A circuit 1102, a transmitter 1103, a receiver 1104, one or more antennas 1105, a non-transitory storage medium or memory 1106. The processing circuit may include a subframe configuration module 1107 which would be involved in all or most of the aforementioned method for configuring eIMTA relay, including both the first exemplary embodiment and the second exemplary embodiment. The non-transitory storage medium 1106 may contain similar information as the non-transitory storage medium 1006 except that it may or may not contain information about valid SubframeConfigurationTDD 904.

In view of the aforementioned descriptions, the present disclosure is suitable for being used in a wireless communication system and is able to allow a relay node to utilize eIMTA by configuring valid TDD UL-DL configurations for relay stations based on configured transmission gaps.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of" and/or, "any combination of multiples of" the items and/or the categories of items, individually or in conjunction with other items and/or other categories of items. Further, as used herein, the teem "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for configuring a table of a Downlink-Uplink (DL-UL) Interference Management and Traffic Adaptation (eIMTA) networking apparatus in a Long Term Evolution (LTE) time division duplex (TDD) system comprising:

identifying, by the eIMTA networking apparatus, from uplink(UL) hybrid automatic repeating request (HARQ) reference configurations and downlink(DL) HARQ reference configurations, valid combinations that are compatible with an eIMTA relay by at least removing a UL-DL subframe configuration having only one UL subframe or only two DL subframes from the UL HARQ reference configurations;

obtaining, by the eIMTA networking apparatus, for each of the valid combinations of the UL HARQ reference configurations and the DL HARQ reference configurations, a subset of a set of valid UL-DL subframe configuration that is compatible with the eIMTA relay by at least removing a UL-DL subframe configuration having only one UL subframe or only two DL subframes from the set of valid UL-DL subframe configuration; and obtaining, by the eIMTA networking apparatus, for each of the valid combinations of the UL HARQ reference configurations and the DL HARQ reference configurations, a subset of a set of valid SubframeConfigurationTDD that is compatible with the eIMTA relay by at least removing a SubframeConfigurationTDD of the set of valid SubframeConfigurationTDD having a UL subframe number appearing in a DL subframe set of the valid combinations of the subset of the set of valid UL-DL subframe configurations.

2. The method of claim 1, wherein identifying, from UL HARQ reference configurations and DL HARQ reference configurations, the valid combinations that are compatible with the eIMTA relay by at least removing the UL-DL subframe configuration having only one UL subframe or only two DL subframes from the UL HARQ reference configurations comprising identifying, from UL HARQ reference configurations and DL HARQ reference configurations, valid combinations that are compatible with the eIMTA relay by at least removing configuration 0 and configuration 5 from the UL HARQ reference configurations.

3. The method of claim 1, wherein obtaining, for the each of the valid combinations of the UL HARQ reference configurations and the DL HARQ reference configurations, the subset of the set of valid UL-DL subframe configuration that is compatible with the eIMTA relay by at least removing a UL-DL subframe configuration having only one UL subframe or only two DL subframes from the set of valid UL-DL subframe configuration comprising:

obtaining, for the each of the valid combinations of the UL HARQ reference configurations and the DL HARQ reference configurations, the subset of the set of valid UL-DL subframe configuration that is compatible with the eIMTA relay by at least removing configuration 0 and configuration 5 from the set of valid UL-DL subframe configuration.

4. The method of claim 1, wherein the DL subframe set is a union of subframe numbers corresponding to DL in all the UL-DL subframe configurations in the valid UL-DL subframe configuration.

5. The method of claim 4, wherein the DL subframe set for subframe configurations 1 and 4 of the valid UL-DL subframe configuration is {0, 1, 4, 5, 6, 7, 8, 9}.

6. The method of claim 5, wherein the subset of the set of valid SubframeConfigurationTDD that is compatible with the eIMTA relay after removing all UL-DL subframe configurations of the set of valid SubframeConfigurationTDD having the UL subframe number appearing in the DL subframe set is {1, 3}.

7. The method of claim 6, wherein the set of valid SubframeConfigurationTDD before removing all UL-DL subframe configuration having the UL subframe number appearing in the DL subframe set is {0, 1, 2, 3, 4}.

8. The method of claim 1 further comprising:

removing any UL-DL subframe configuration in the set of valid SubframeConfigurationTDD in which subframe number 2 corresponding to UL for the DL HARQ reference configuration equals to 5.

9. The method of claim 1 further comprising:

configuring the eIMTA relay according to the subset of the set of valid SubframeConfigurationTDD for each of the valid combinations of the UL HARQ reference configurations and the DL HARQ reference configurations.

10. The method of claim 1, wherein the UL reference configurations, the DL reference configurations, the valid combinations of UL-DL configurations, and the set of the valid SubframeConfigurationTDD are defined according to the following table:

| UL HARQ reference configuration | DL HARQ reference configuration | Valid combinations of UL-DL configurations | Valid SubframeConfigurationTDD |
|---|---|---|---|
| 1 | 4 | 1, 4 | 1, 3 |
| 2 | 2 | 2 | 5, 6, 7, 8, 9, 10 |
| 2 | 5 | 2 | 6, 8, 10 |
| 3 | 4 | 3, 4 | 11, 12 |
| 3 | 5 | 3, 4 | 11, 12 |
| 4 | 4 | 4 | 13, 14, 15, 16, 17 |
| 4 | 5 | 4 | 13, 14, 15, 16, 17. |

11. The method of claim 1, where the DL HARQ reference configuration is selected from UL-DL subframe configuration 2, 4, and 5.

12. The method of claim 1, wherein subframes that are configured as UL in the DL-HARQ reference configurations cannot be dynamically changed to a DL subframe, and subframes that are configured as DL in the UL HARQ reference configurations cannot be dynamically changed to an UL subframe.

13. A networking apparatus comprising:
a transmitter for transmitting wireless data;
a receiver for receiving wireless data;
a non-transitory storage medium which includes a table that records relationships among UL HARQ reference configurations, DL HARQ reference configurations, valid combinations of UL-DL configurations, and valid SubframeConfigurationTDD; and
a processing circuit comprising:
a subframe configuration module that adopts a configuration of the networking apparatus according to the relationships among UL HARQ reference configurations, DL HARQ reference configurations, valid combinations of UL-DL configurations, wherein the relationships are defined according to the below table:

| UL HARQ reference configuration | DL HARQ reference configuration | Valid combinations of UL-DL configurations | Valid SubframeConfigurationTDD |
|---|---|---|---|
| 1 | 4 | 1, 4 | 1, 3 |
| 2 | 2 | 2 | 5, 6, 7, 8, 9, 10 |
| 2 | 5 | 2 | 6, 8, 10 |
| 3 | 4 | 3, 4 | 11, 12 |
| 3 | 5 | 3, 4 | 11, 12 |
| 4 | 4 | 4 | 13, 14, 15, 16, 17 |
| 4 | 5 | 4 | 13, 14, 15, 16, 17. |

14. The network apparatus of claim 13, wherein the network apparatus is capable of implementing two system information changes within a modification period.

15. A method for configuring a table of a network apparatus in a Long Term Evolution (LTE) time division duplex (TDD) system comprising:
determining supported uplink(UL)-downlink(DL) subframe configurations for transmissions between an evolved node B (eNB) and a relay node (RN) by defining relationships among SubframeConfigurationTDD, eNB-RN UL-DL configuration, and subframe numbers;
augmenting the supported UL-DL subframe configurations by including three DL hybrid automatic repeating request (HARQ) reference configurations;
determining valid combinations by obtaining a set of valid UL-DL subframe configuration for dynamic reconfiguration for each combination of SubframeConfigurationTDD, eNB-RN UL-DL configuration, and DL HARQ reference configuration; and
configuring an eIMTA relay according to the valid combinations.

16. The method of claim 15, wherein the three DL HARQ reference configurations are configurations 2, 4, and 5.

17. The method of claim 16, wherein augmenting the supported UL-DL subframe configurations by including three DL hybrid automatic repeating request (HARQ) reference configurations further comprising:
refining the three DL HARQ reference configurations by removing DL HARQ=5 when subframe number 2 in the associated SubframeConfigurationTDD corresponds to an UL subframe.

18. The method of claim 16, wherein determining valid combinations by obtaining the set of valid UL-DL subframe configuration for dynamic reconfiguration for each combination of SubframeConfigurationTDD, eNB-RN UL-DL configuration, and DL HARQ reference configuration further comprising:
removing UL-DL subframe configuration 5 from all sets of the valid UL-DL subframe configurations for dynamic reconfiguration.

19. The method of claim 18 further comprising:
refining all sets of the valid UL-DL subframe configuration for dynamic reconfiguration by removing any UL-DL subframe configuration in which subframe number corresponding to DL is the same as subframe number corresponding to UL in SubframeConfigurationTDD.

20. The method of claim 15, wherein the relationships among SubframeConfigurationTDDs, eNB-RN UL-DL configurations, DL HARQ reference configurations, and valid UL-DL subframe configurations for dynamic reconfiguration are defined according to:

| SubframeConfigurationTDD | eNB-RN UL-DL configuration | DL HARQ Reference configuration | Valid UL-DL Configurations for dynamic reconfiguration |
|---|---|---|---|
| 0 | 1 | 2 | 1 |
|   |   | 4 | 1 |
|   |   | 5 | 1 |
| 1 |   | 2 | 1 |
|   |   | 4 | 1, 4 |
|   |   | 5 | 1, 4 |
| 2 |   | 2 | 1 |
|   |   | 4 | 1 |
|   |   | 5 | 1 |
| 3 |   | 2 | 1 |
|   |   | 4 | 1, 4 |
|   |   | 5 | 1, 4 |
| 4 |   | 2 | 1 |
|   |   | 4 | 1 |
|   |   | 5 | 1 |
| 5 | 2 | 2 | 2 |
| 6 |   | 2 | 2 |
|   |   | 5 | 2 |
| 7 |   | 2 | 2 |
| 8 |   | 2 | 2 |
|   |   | 5 | 2 |
| 9 |   | 2 | 2 |
| 10 |   | 2 | 2 |
|   |   | 5 | 2 |
| 11 | 3 | 4 | 3, 4 |
|   |   | 5 | 3, 4 |
| 12 |   | 4 | 3, 4 |
|   |   | 5 | 3, 4 |
| 13 | 4 | 4 | 4 |
|   |   | 5 | 4 |
| 14 |   | 4 | 4 |
|   |   | 5 | 4 |
| 15 |   | 4 | 4 |
|   |   | 5 | 4 |
| 16 |   | 4 | 4 |
|   |   | 5 | 4 |
| 17 |   | 4 | 4 |
|   |   | 5 | 4 |
| 18 | 6 | 2 | 6 |
|   |   | 4 | 3, 6 |
|   |   | 5 | 3, 6. |

* * * * *